Patented Feb. 16, 1926.

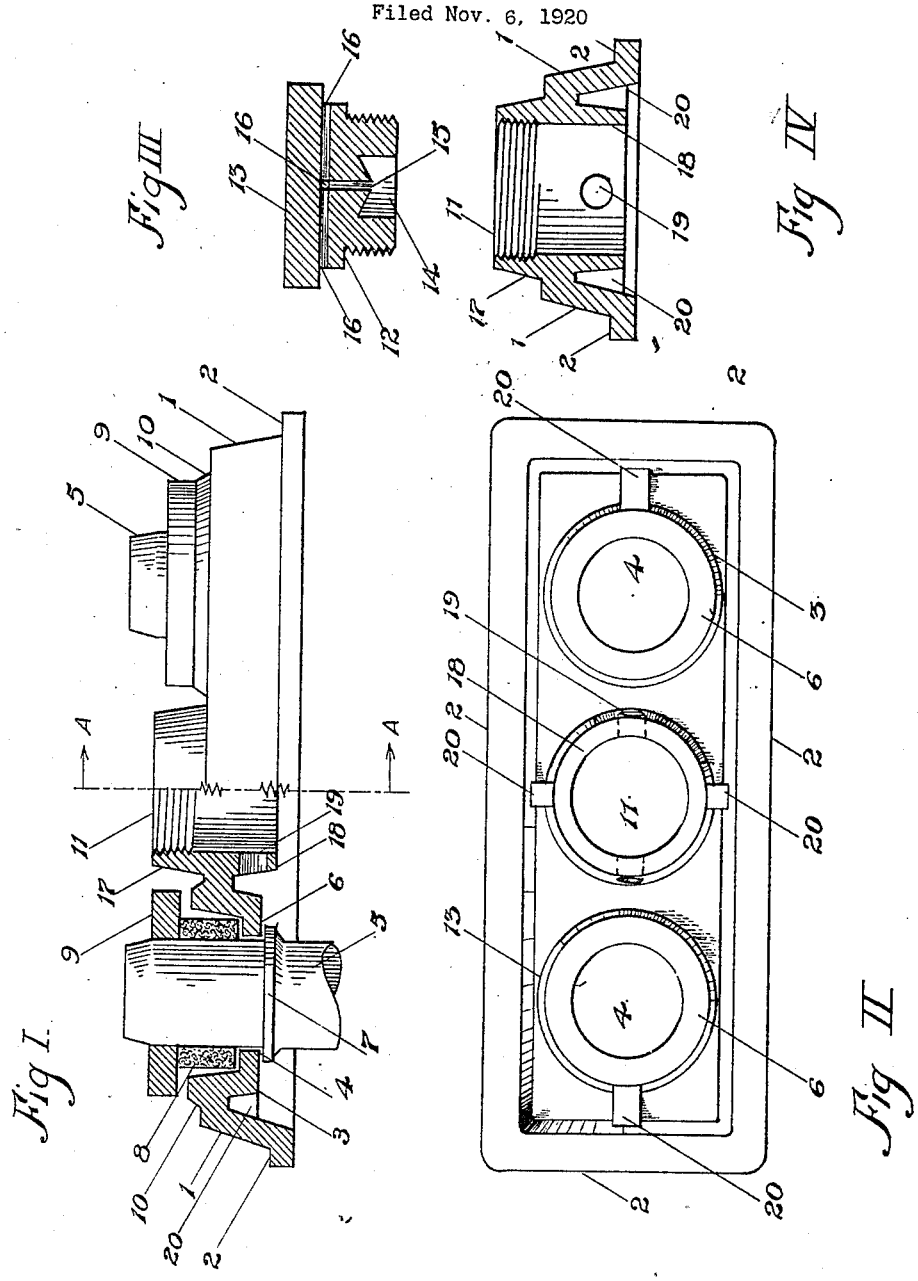

1,573,462

UNITED STATES PATENT OFFICE.

CHARLES A. THATCHER, OF PORTLAND, OREGON.

BATTERY COVER.

Application filed November 6, 1920. Serial No. 422,156.

*To all whom it may concern:*

Be it known that I, CHARLES A. THATCHER, a citizen of the United States, residing at Portland, in the county of Multnomah and State of Oregon, have invented a new and useful Battery Cover, of which the following is a specification.

My invention relates to improvements in battery covers with novel means for sealing the terminal posts and venting the storage battery.

The objects of my invention are to effect a simple and permanent seal around the terminal posts and to construct a filling plug which may serve simultaneously as a vent.

I attain these objects with the means illustrated in the accompanying drawing, in which—

Fig. I is a side view of the cover, the left half thereof being shown in section.

Fig. II is a bottom view of the cover without posts and plug.

Fig. III shows the filling plug in section.

Fig. IV is a section through Fig. I along the line A—A.

Similar numerals refer to similar parts throughout the several views.

The cover is composed of hard rubber or any other suitable material, and may be inserted in the battery jar in the customary manner. The space between the sloping side walls 1, the bottom flange 2 and the walls of the battery jar (not shown) is to be filled in the usual way with some acid proof binder.

Cast integrally with the cover, at each end thereof, are the cups 3 with openings 4 in the bottom through which the terminal posts 5 emerge. The bottom 6 of each cup is intended to rest on the collar 7 of the terminal post.

Over the terminal post is slipped first the rubber washer 8 and then on top of it a leaden washer 9. The washer and post may be threaded if desired, but for convenience of manufacture it is preferred that the washer should simply be pressed on, as the friction between the two elements is ample to effect a tight connection. As the leaden washer is pressed down to the rim 10 of the cup the rubber washer will fill out the hollow of the cup and effect a tight and permanent seal around the terminal post.

The left side of Fig. I shows the leaden and rubber washers before compression of the latter; at the right side the leaden washer has been pressed down to the rim 10, and it will be noted that the rubber washer fills the hollow of the cup.

It naturally follows therefore that, since the rubber washer 8 is distorted and fills the hollow of the cup when the leaden washer 9 is forced down to the rim of the cup, the rubber washer in its initial or normal state has a volume greater than the volume of the cavity or cup, so that in its compressed state it is highly effective for the specified purpose. Moreover it is obvious that it is held in such compressed state by the leaden washer which engages the terminal post and does not rely upon any active support in connection with the battery top.

I have shown the rubber washer 8 of cylindrical form, but it is also obvious other forms may be utilized with the same results, in view of the fact that its original form is more or less lost in its distortion when compressed to constitute the seal as above described.

The filling plug in Fig. III may be of any suitable material and is provided with threads to be screwed into the fill opening 11. Above the threads is a shoulder 12 and surmounting the latter a head 13. The threaded end has a large axial bore 14 and in continuation thereof a smaller bore 15 which terminates within the shoulder to connect with four radially diverging vent holes 16. The bottom of the large bore 14 is convex so that the surging liquid in the jar will break harmlessly around the edges instead of spilling through the bore 15 in the center.

The upper walls 17 of the fill opening are carried high enough to give convenient access to the filling plug for unscrewing the same. The lower walls 18 reach down to the level of the liquid, and are provided with vent holes 19 through which the generated gases may reach the vent holes in the plug.

20 indicates stiffening ribs at the under side of the cover.

Having thus described my invention, it will be seen that my object has been accomplished, and, though I have shown the preferred form of construction, I reserve to myself the right to make minor changes, providing I do not contravene the spirit and principle of my invention.

I claim:

1. A method for producing a liquid tight seal between the terminal lug and the cover of a storage battery cell which comprises providing an annular groove between said terminal and said cover, placing a resilient ring of compressible material into said annular groove, said ring in its normal state having a greater volume than the volume of the groove, compressing said ring to substantially the volume of the groove, and retaining the ring in its compressed condition.

2. A liquid tight seal comprising a cover member having an opening, a terminal lug member projecting through the opening, the wall of the cover where it surrounds the bottom of the opening being substantially of the same diameter as the cooperating portion of the lug, the said wall and the lug being spaced from each other above the bottom of the wall to form a cavity, a preformed gasket of resilient compressible material and of an initial volume greater than that of said cavity, and means for compressing the gasket to a volume substantially equal to that of the cavity.

3. A liquid tight seal comprising in combination a terminal lug having a tapering portion, a cover member having an opening through which the lug extends, the walls of the opening being inclined with respect to the adjacent surface of the lug, whereby a cavity is formed, a preformed gasket of compressible material and of an initial volume greater than that of said cavity, and a nut having engagement with the lug for compressing the gasket to a volume substantially equal to that of the cavity.

4. In a battery cover, the combination of a cover, a cup-shaped depression in the cover, the rim of the cup-shaped depression being of substantial depth, a central opening in the bottom of the cup-shaped depression, with a terminal post projecting through said central opening, a preformed compressible washer encircling the terminal post within the cup-shaped depression, said washer when uncompressed projecting above the rim of the cup-shaped depression, a compression member retained on the terminal post above the washer and, when pressed down to the rim of the cup-shaped depression, compressing the rubber washer to fill out the cup-shaped depression and form an easily removable, flexible, air and water tight seal around the terminal post.

Signed by me at Portland this 29th day of October, 1920.

CHARLES A. THATCHER.